United States Patent [19]

Vassallo

[11] Patent Number: 4,785,724

[45] Date of Patent: Nov. 22, 1988

[54] APPARATUS FOR AERATING BOTTLED WINE

[75] Inventor: Domenico A. Vassallo, Westwood, N.J.

[73] Assignee: Euromark, Inc., N.J.

[21] Appl. No.: 26,328

[22] Filed: Mar. 16, 1987

[30] Foreign Application Priority Data

May 16, 1986 [IT] Italy .............................. 53423/86[U]

[51] Int. Cl.$^4$ ........................... B01F 3/04; C12H 1/00
[52] U.S. Cl. ..................................... 99/323.1; 261/124
[58] Field of Search .................... 99/323.1, 323.2, 275; 366/101, 107; 261/124, 26, 30; 417/413; 222/401

[56] References Cited

U.S. PATENT DOCUMENTS

| 19,960 | 4/1858 | Allen | 99/323.1 |
| 2,057,068 | 10/1936 | Speer | 99/323.1 |
| 3,746,478 | 7/1973 | Willinger | 417/413 |
| 4,022,119 | 5/1977 | Karr | 99/275 |
| 4,401,607 | 8/1983 | Child | 99/323.2 |
| 4,477,477 | 10/1984 | Arter | 99/275 |
| 4,494,452 | 1/1985 | Barzso | 99/323.1 |

FOREIGN PATENT DOCUMENTS 91941 6/1871 France .............................. 99/323.1

Primary Examiner—Harvey C. Hornsby
Assistant Examiner—Scott J. Hausland
Attorney, Agent, or Firm—Sughrue, Mion, Zinn, Macpeak & Seas

[57] ABSTRACT

Apparatus for aerating bottled wine comprises a housing on which the bottle rests, a compressor driven by an electric motor located within the housing, and a delivery tube associated with the compressor and having a distal portion which can be inserted into the bottled wine to aerate it.

5 Claims, 1 Drawing Sheet

APPARATUS FOR AERATING BOTTLED WINE

The present invention relates to apparatus for aerating bottled wine, comprising a housing, a compressor driven by an electric motor located in the housing, and a delivery tube associated with the compressor and having a distal portion which can be inserted into the bottled wine to aerate it.

Apparatus of the type specified above is described and illustrated in U.S. Pat. No. 4,494,452. The housing of this known device can be located above the neck of a bottle in order for the delivery tube to be inserted into the wine and for air to be injected into the wine itself.

The benefits resulting from aeration of wine before consumption are known to all connoisseurs. With matured wine in particular, it is necessary to aerate it well in order to ensure that its characteristics are fully restored on tasting. The conventional way of aerating wine, which is known to all connoisseurs, consists of decanting the wine from the bottle in which it has been matured into another vessel, preferably with a wide mouth, so as to allow the wine to breath during decanting.

The known apparatus allows the same result to be achieved without the wine having to be removed from the bottle. However, this known apparatus has a series of disadvantages. In the first place, the fact that the entire apparatus must be located above the bottle places limits on the dimensions and weight of the apparatus, resulting in the practical impossibility of accommodating an electrical battery in the housing. The known apparatus is thus provided with an electrical cable for connection to the mains, which means that the apparatus is not very manageable, unstable and impractical in use, particularly by a waiter in a restaurant. Moreover, because of the risk of the air from the delivery tube disturbing the residue at the bottom of the bottle, the tube is inserted only a relatively short way into the bottle, with the result that the aeration of the wine in the lower part of the bottle is quite insufficient (the air bubbles leaving the delivery tube tend to move upwardly).

The object of the present invention is to provide apparatus of the type indicated at the beginning of the present specification, which does not have the disadvantages of the prior art.

In order to achieve this object, the invention provides apparatus of the type specified above, characterised by the combination of the following features:

(a) the housing has an upper wall for supporting the bottle, (b) the delivery tube includes a base portion projecting upwardly from the upper wall, the distal portion having an inverted U shape with an ascending arm whose lower end is releasably connected to the base portion, and a descending arm which can be inserted in the bottle so as to extend through a substantial part of its length, (c) the descending arm of the delivery tube terminates in a delivery bulb having an upwardly-tapered configuration and a plurality of outlet apertures solely in its lateral surface, (d) a battery for supplying the electric motor is located in the housing.

In the apparatus of the invention, the housing of the apparatus is used as a base on which the bottle stands. The housing may thus be made large enough to contain a battery for the electrical supply, making the apparatus more manageable and practical in use than the known apparatus mentioned above. Moreover, since the outlet apertures for the air are located on the lateral surface of a delivery bulb which has an upwardly-tapered configuration, any risk of the air interfering with any wine residue at the bottom of the bottle is prevented. This enables the descending arm of the delivery tube to be arranged so that it passes through a substantial part of the height of the bottle.

Preferably, the base portion of the delivery tube to which the distal portion of the tube is connected is adjustable in height so as to allow the tube to be adapted to bottles of different heights. This characteristic is not indispensable, however, since the delivery tube may be made of a size suitable for the tallest bottles available commercially. The fact that the distal portion can be uncoupled enables the bottle to be positioned and the delivery bulb to be washed easily in every case.

The compressor used by the apparatus of the invention may be, for example, a pump of the type commonly used in aquaria (as is also the case in the prior-art apparatus). The motor for driving the pump may be an electromagnetic motor which is supplied with the direct current by the battery through an electrical circuit which generates an alternating current. Alternatively, the compressor may be constituted by an axial fan driven by a rotary electric motor which can be supplied with direct current.

According to a further characteristic of the present invention, the apparatus includes regulable timing means for stopping the supply to the electric motor after a predetermined time interval. The user may thus operate the device after having selected an operating time corresponding to the aeration needs, which depend on the age of the wine, without having to monitor the operation continuously. This aspect is particularly advantageous in use in a restaurant.

Further characteristics and advantages of the invention will become apparent from the description which follows with reference to the appended drawings, provided purely by way of non-limiting example, in which.

Figure 1:
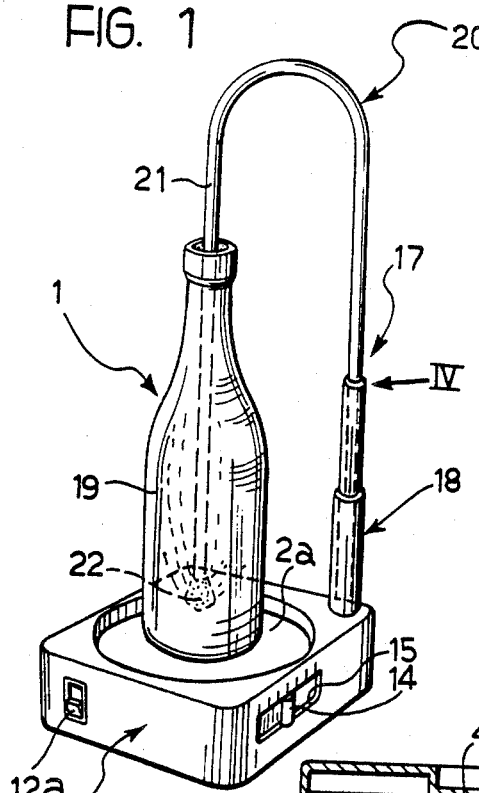
FIG. 1 is a perspective view of apparatus according to the invention.
Figure 4:
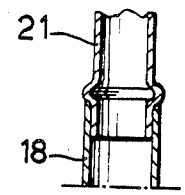
FIGS. 3 and 4 are a perspective view and a sectional view of two details of the device of FIG. 1 on an enlarged scale.
Figure 3:
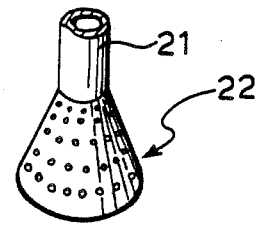
Figure 2:
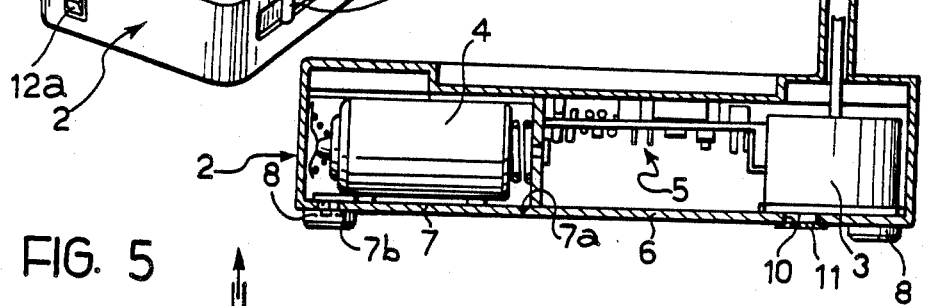
FIG. 2 is a partially sectioned view of the apparatus of FIG. 1.
Figure 5:
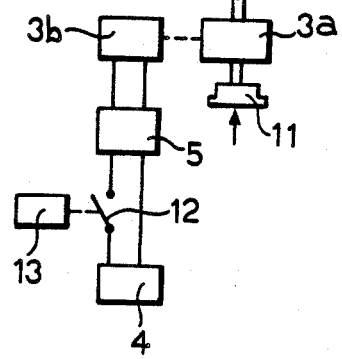
FIG. 5 is a block schematic diagram illustrating the internal structure of the apparatus of FIG. 1.

In the drawings, apparatus for aerating bottle wine is generally indicated 1 and includes a housing 2 within which is a group 3 constituted by a diaphragm pump 3a (FIG. 5), of the type generally used for aquaria and its electromagnetic operating motor 3b (FIG. 5), as well as an electrical supply battery 4 and an electrical circuit 5 which connects the battery 4 to the motor 3b of the group 3 and includes a chopper circuit for generating an alternating current from the direct current provided by the battery 4. These elements are disposed within the housing 2 (of plastics material in the embodiment illustrated) which has a base 6 releasable from the rest of the body of the housing 2 (for example, by means of screws) and having a part 7 for access to the battery 4 which is connected to the wall 6 by means of a hinge 7a constituted by a thinner portion of the wall 6 and which can be locked in the closed position by means of a latch 7b. The body of the apparatus 2 also has feet 8 which keep the base 6 spaced from the support plane. The air drawn in by the pump 3a of the group 3 is fed through an aperture 10 formed in the base 6 and in which there is a filter 11 connected to the wall 6 in a releasable manner so as to allow it to be replaced easily when it becomes excessively dirty after prolonged use. A switch 12 (FIG. 5) is interposed in the connection between the battery 4 and the motor 3b of the motor 3, and has an operating button 12a located on the outer wall of the housing 2. The switch 12 is also controlled by a known type of timing device 13 (FIG. 5) which can be regulated. The regulation of the device 13 is effected by means of a slider 14 slidable in a slot 15 formed in the side wall of the housing 2 and cooperating with a graduated scale 16. The apparatus is provided with a delivery tube 17 having a base portion 18 projecting upwardly from an upper wall 2a of the housing 2, which acts as a support base for a bottle 19 containing the wine to be aerated. In the embodiment illustrated, the base portion 18 is formed as a telescopic rod so that its height can be adjusted. The delivery tube 17 also includes a distal portion 28 having an inverted U shape, comprising an ascending arm the lower end of which is connected to the upper end of the base portion 18 by a press fit (FIG. 4) which ensures sealing, and a descending arm 21 which is inserted in the bottle 19 for a substantial part of the height thereof. The lower end of the descending arm 21 terminates in a delivery bulb 22 (see also FIG. 3) which has an upwardly-tapered configuration (in the embodiment illustrated, a conical shape) with a plurality of outlet apertures disposed solely in its lateral surface. By virtue of this particular arrangement, any interaction between the air supplied and any wine residue at the bottom of the bottle is prevented, with the advantage that the delivery bulb 22 can be placed near the bottom of the bottle to ensure complete aeration of the whole contents of the bottle.

The delivery tube 17 is preferably made from stainless steel, while the body 2 of the apparatus may be constituted by a plastics material (as in the embodiment illustrated) or metal.

Figure 6:
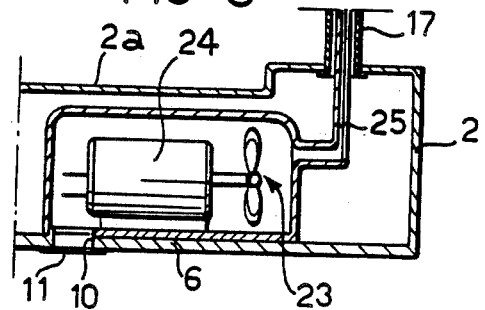
FIG. 6 is a variant of FIG. 2.

In one variant (FIG. 6) the compressor of the apparatus is constituted by an axial fan 23 which is driven by an electric motor 24 and which conveys the inducted air to the delivery tube 17 through a duct 25.

Naturally, the principle of the invention remaining the same, the constructional details and forms of embodiment may be varied widely with respect to those described and illustrated purely by way of example, without thereby departing from the scope of the present invention.

For example, the battery 4 may be of a rechargeable type. In this case, a female connector must be provided on a wall of the housing 2 (for example, the wall opposite that carrying the slider 14), the connector being connected to the battery to receive the usual pin of the supply cable which is connected to the mains and serves to recharge the battery.

I claim:

1. Apparatus for aerating bottled wine, comprising:
   a housing,
   a compressor driven by an electric motor located in the housing; and
   a delivery tube associated with the compressor and having a distal portion which can be inserted into the bottled wine to aerate it characterized by the combination of the following features:
   (a) the housing has an upper wall for supporting the bottle,
   (b) the delivery tube includes an adjustable height telescopic base portion projecting upwardly from the upper wall, the distal portion having an inverted U shape with an ascending arm lower end of which is releasably connected to the base portion by means of a detachable press fit connection, and a descending arm which can be inserted into the bottle for a substantial part of its length,
   (c) the descending arm of the delivery tube terminates in a delivery bulb having an upwardly-tapered configuration, a tapered lateral surface, and a plurality of outlet apertures solely in said tapered lateral surface,
   (d) a battery for supplying the electric motor is located in the housing.

2. Apparatus according to claim 1, characterised in that the base portion of the delivery tube is constituted by a telescopic rod.

3. Apparatus according to claim 1, further comprising a switch and a regulable timer characterised in that the battery for supplying the electric motor is connected to it by means of the switch which is controlled by the regulable timer, the outer wall of the housing having a manually-operable push-button for operating the switch, a graduated scale on the outer surface of the housing, and a movable member which cooperates with the graduated scale for controlling the timer.

4. Apparatus according to claim 1, characterised in that the compressor is constituted by a diaphragm pump and the motor is an electromagnetic motor connected to the battery by a chopper circuit.

5. Apparatus according to claim 1, characterised in that the compressor is constituted by an axial fan and in that the apparatus includes a battery tube, the axial fan directing the inducted air to the delivery tube and in that the motor is constituted by an electric motor on whose shaft the fan is mounted.

* * * * *